(12) United States Patent
Moon et al.

(10) Patent No.: US 9,761,946 B2
(45) Date of Patent: Sep. 12, 2017

(54) NFC ANTENNA AND ELECTRONIC DEVICE WITH THE SAME

(71) Applicant: SAMSUNG ELECTRONICS CO., LTD., Suwon-si, Gyeonggi-do (KR)

(72) Inventors: Byeongtaek Moon, Seoul (KR); Iljong Song, Suwon-si (KR); Yohan Jang, Seoul (KR); Sangsu Shin, Jecheon-si (KR); Hyeonhee Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 65 days.

(21) Appl. No.: 14/803,633

(22) Filed: Jul. 20, 2015

(65) Prior Publication Data

US 2016/0148752 A1    May 26, 2016

(30) Foreign Application Priority Data

Nov. 26, 2014  (KR) ........................ 10-2014-0166713

(51) Int. Cl.
| | |
|---|---|
| *H01Q 7/00* | (2006.01) |
| *H04B 5/00* | (2006.01) |
| *H01Q 1/22* | (2006.01) |
| *H01Q 19/28* | (2006.01) |
| *H01Q 7/02* | (2006.01) |

(52) U.S. Cl.
CPC ............. *H01Q 7/00* (2013.01); *H01Q 1/2208* (2013.01); *H01Q 19/28* (2013.01); *H04B 5/0087* (2013.01)

(58) Field of Classification Search
CPC ...... H01Q 1/08; H01Q 1/2208; H01Q 1/2216; H01Q 7/00; H01Q 7/02; H01Q 1/241–1/244; H01Q 1/2225; H04B 5/0081; H04B 5/04; H04B 5/0062; H04B 5/0056; H04B 5/0093; H01F 5/00
USPC ....... 343/702, 741, 742, 744, 748, 764, 788, 343/855, 866, 867; 455/41.1; 340/568.1, 340/572.1
See application file for complete search history.

(56) References Cited

U.S. PATENT DOCUMENTS

| | | | | |
|---|---|---|---|---|
| 5,049,856 | A * | 9/1991 | Crossfield | G08B 13/2408 340/505 |
| 5,825,335 | A * | 10/1998 | Arai | H01Q 1/38 343/742 |
| 7,268,687 | B2 | 9/2007 | Egbert et al. | |
| 7,825,802 | B2 * | 11/2010 | Baiker | B61L 1/10 340/10.1 |
| 8,378,917 | B2 * | 2/2013 | Yoneda | H01Q 1/22 343/742 |
| 8,531,346 | B2 * | 9/2013 | Kimura | G06K 19/07749 343/700 MS |
| 8,558,752 | B2 * | 10/2013 | Amadeo | G06K 19/07779 343/742 |
| 2005/0134519 | A1 * | 6/2005 | Fukano | G06K 7/10336 343/867 |

(Continued)

FOREIGN PATENT DOCUMENTS

JP         4069377        1/2008

*Primary Examiner* — Jessica Han
*Assistant Examiner* — Awat Salih
(74) *Attorney, Agent, or Firm* — Volentine & Whitt, PLLC

(57) ABSTRACT

A near field communication (NFC) antenna includes a first loop for receiving an electrical signal from the outside and a plurality of closed loops disposed in an inner area of the first loop. The plurality of closed loops do not overlap each other.

16 Claims, 9 Drawing Sheets

(56) References Cited

U.S. PATENT DOCUMENTS

| | | | |
|---|---|---|---|
| 2005/0179604 A1* | 8/2005 | Liu | G06K 19/07749 343/742 |
| 2007/0109210 A1* | 5/2007 | Bacquet | H01Q 7/00 343/742 |
| 2007/0182658 A1* | 8/2007 | Ozden | H01Q 1/243 343/866 |
| 2008/0068272 A1* | 3/2008 | Matsushita | G06K 19/07749 343/741 |
| 2008/0245851 A1* | 10/2008 | Kowalski | G06K 7/10178 235/375 |
| 2009/0040734 A1* | 2/2009 | Ochi | G06K 19/0723 361/737 |
| 2010/0328173 A1* | 12/2010 | Rao | H01Q 1/242 343/742 |
| 2011/0043430 A1* | 2/2011 | Bashan | G06K 19/07754 343/866 |
| 2012/0091821 A1* | 4/2012 | Kato | H01Q 1/38 307/104 |
| 2012/0092222 A1* | 4/2012 | Kato | G08B 13/00 343/742 |
| 2012/0112980 A1* | 5/2012 | Kaikkonen | H01Q 1/2225 343/867 |
| 2012/0176278 A1* | 7/2012 | Merz | H01Q 1/243 343/702 |
| 2012/0178382 A1* | 7/2012 | Merz | H04B 1/38 455/73 |
| 2012/0178503 A1* | 7/2012 | Merz | H01Q 1/2266 455/566 |
| 2012/0223149 A1* | 9/2012 | Kato | H01Q 1/2216 235/492 |
| 2012/0262345 A1* | 10/2012 | Kim | H01Q 1/243 343/702 |
| 2013/0183897 A1* | 7/2013 | Cordier | G06F 1/1698 455/41.1 |
| 2014/0002225 A1 | 1/2014 | Konanur et al. | |
| 2014/0011447 A1* | 1/2014 | Konanur | H04B 5/00 455/41.1 |
| 2014/0168019 A1* | 6/2014 | Hirobe | H01Q 1/38 343/720 |
| 2014/0179224 A1* | 6/2014 | Liao | H01Q 1/273 455/41.1 |
| 2014/0292590 A1* | 10/2014 | Yoo | H01Q 1/243 343/702 |
| 2015/0077296 A1* | 3/2015 | An | H01Q 1/22 343/720 |
| 2015/0097741 A1* | 4/2015 | Pachler | H01Q 5/0024 343/742 |
| 2015/0145742 A1* | 5/2015 | Cao | H01Q 1/38 343/788 |

* cited by examiner

NFC ANTENNA AND ELECTRONIC DEVICE WITH THE SAME

CROSS-REFERENCE TO RELATED APPLICATION

This application claims priority under 35 U.S.C. §119 to Korean Patent Application No. 10-2014-0166713 filed on Nov. 26, 2014, the disclosure of which is hereby incorporated by reference in its entirety.

BACKGROUND

Field

Embodiments of the application relate to an improved near field communication (NFC) antenna and an electronic device having the NFC antenna, and more particularly, relate to an improved NFC antenna included in an NFC reader which is an electronic device such as a mobile device, etc.

Description of Related Art

A near field communication (NFC) reader, which is a mobile device such as a smart phone, tablet PC, etc., which are examples of electronic devices, embeds NFC circuitry in the form of a chip to perform NFC with an NFC tag such as a smart card. Furthermore, the mobile device, i.e., the NFC reader, includes a separate loop antenna for NFC.

When a tag is close to a reader, NFC is performed between the reader and the tag using a magnetic coupling between a loop antenna formed on the reader and a loop antenna formed on the tag. Here, NFC is satisfactorily performed by forming an area of the loop antenna of the reader smaller than or similar to an area of the loop antenna of the tag.

Recently, it has been necessary to dramatically increase the area of the loop antenna of the reader.

When the area of the loop antenna of the reader becomes much larger than the area of the loop antenna of the tag, for example, when the area of the loop antenna of the reader is more than twice as large as the area of the loop antenna of the tag, an area, where the magnetic coupling between the loop antenna of the reader and the loop antenna of the tag is not generated, exists in inner area of the loop antenna of the reader, and this causes NFC to be impossible thereat.

Accordingly, it becomes necessary not to generate an area where NFC is impossible inside the loop antenna of the reader even when the loop antenna of the reader is much larger.

SUMMARY

Embodiments of the application provide an improved near field communication (NFC) antenna capable of removing a non-communication area generated when the area of a loop antenna of a NFC reader becomes large.

Other embodiments of the application provide an electronic device having the improved NFC antenna.

The technical objectives of the application are not limited to the above disclosure; other objectives may become apparent to those of ordinary skill in the art based on the following descriptions.

In accordance with an aspect of the application, an antenna of an NFC reader includes a first loop for receiving an electrical signal from the outside and a plurality of closed loops disposed in an inner area of the first loop. The plurality of closed loops do not overlap each other.

In an embodiment, each of the plurality of closed loops may be magnetically coupled to the first loop.

In another embodiment, the first loop may be formed on one side of a substrate, and the plurality of closed loops may be formed on the one side or the other side of the substrate.

In still another embodiment, the first loop may be formed on one side of a first substrate, and the plurality of closed loops may be formed on one side or the other side of a second substrate.

In yet another embodiment, the first loop may be formed as a metal frame supporting sides of an electronic device, and the plurality of closed loops may be formed on one side of a substrate.

In yet another embodiment, a shape of a part of each of the plurality of closed loops, adjacent to the first loop, may correspond to a shape of an adjacent part of the first loop.

In yet another embodiment, a size of each of the closed loops may be equal to or less than 110% of a size of a loop antenna formed on an adjacent NFC tag.

In accordance with another aspect of the application, an NFC reader device includes NFC circuitry for performing NFC, an antenna connected to the NFC circuitry, and a matching circuit for performing impedance matching between the NFC circuitry and the antenna. The antenna includes a first loop for receiving an electrical signal and a plurality of closed loops disposed in an inner area of the first loop. The plurality of closed loops do not overlap each other.

In an embodiment, each of the plurality of closed loops may be magnetically coupled to the first loop.

In another embodiment, the first loop may be formed on one side of a substrate, and the plurality of closed loops are formed on the one side or the other side of the substrate.

In still another embodiment, the first loop may be formed on one side of a first substrate and the plurality of closed loops may be formed on one side or the other side of a second substrate.

In yet another embodiment, the first loop may be formed in a form of a metal frame supporting sides of an electronic device, and the plurality of closed loops may be formed on one side of a substrate.

In yet another embodiment, a shape of a part of each of the plurality of closed loops, adjacent to the first loop, may correspond to a shape of an adjacent part of the first loop.

In yet another embodiment, a size of each of the closed loops may be equal to or less than 110% of a size of a loop antenna formed on an adjacent NFC tag.

In yet another embodiment, the first loop may be not directly connected to a ground.

In accordance with still another aspect of the application, an electronic device includes a processor, a display panel for displaying an image signal processed by the processor, a printed circuit board including the processor and NFC circuitry, and an NFC antenna connected to the NFC circuitry. The NFC antenna includes a first loop for receiving an electrical signal and a plurality of closed loops disposed in an inner area of the first loop. The plurality of closed loops do not overlap each other.

In an embodiment, each of the plurality of closed loops may be magnetically coupled to the first loop.

In another embodiment, the electronic device may further include an antenna substrate disposed between the printed circuit board and the display panel, the first loop may be formed on one side of the antenna substrate, and the plurality of closed loops may be formed on the one side or the other side of the antenna substrate.

In still another embodiment, the electronic device may further include a first antenna substrate and a second antenna substrate disposed between the printed circuit board and the display panel, the first loop may be formed on one side of the first antenna substrate, and the plurality of closed loops may be formed on the one side or the other side of the second antenna substrate.

In yet another embodiment, the first loop may be formed in a form of a metal frame surrounding sides of a body having the printed circuit board, and the plurality of closed loops may be formed on one side of an antenna substrate disposed between the printed circuit board and the display panel.

In accordance with still another aspect of the application, an antenna includes an outer electrically-conductive loop and one or more electrically-conductive closed loops that each has a smaller perimeter than the perimeter of the outer loop. An electrical current flowing through the outer loop induces an electrical current to flow through each of the one or more closed loops through an electromagnetic field.

In an embodiment, the one or more closed loops is two or more closed loops and at least one of the two or more closed loops has a different perimeter than another of the two or more closed loops.

In an embodiment, the one or more closed loops is two or more closed loops and two of the two or more closed loops have the same geometric shape but different orientations with respect to the outer loop.

In an embodiment, the one or more closed loops is two or more closed loops and each of the two or more closed loops is oriented with respect to the outer loop so as to maximize an amount of its perimeter having the same contour as a portion of the outer loop that is closest to the closed loop.

In an embodiment, the one or more closed loops is two or more closed loops and the two or more closed loops are oriented with respect to the outer loop so as to maximize the combined electromagnetic coupling between the outer loop and the two or more closed loops compared to any other orientation of the two or more closed loops.

In an embodiment, the resonant frequency of each of the one or more closed loops is approximately 13.56 MHz.

In an embodiment, the resonant frequency of the outer loop is less than 13.56 MHz.

In an embodiment, the one or more closed loops are confined to an area smaller than that defined by the outer loop.

In an embodiment, when a plane containing the entirety of the outer loop is projected upon a plane containing the entirety of the one or more closed loops, the closed loops are disposed within the periphery of the outer loop.

In an embodiment, a mobile computing device includes the antenna and the perimeter of the mobile computing device is substantially the same as the combined lengths of the perimeter of the outer loop and the length of an insulator separating electrodes disposed at opposite ends of the outer loop.

BRIEF DESCRIPTION OF THE DRAWINGS

The foregoing and other features and advantages of the application will be apparent from the more particular description of preferred embodiments of the application, as illustrated in the accompanying drawings in which like reference characters refer to the same parts throughout the different views. The drawings are not necessarily to scale, emphasis instead being placed upon illustrating the principles of the application. In the drawings.

DETAILED DESCRIPTION OF THE EMBODIMENTS

Figure 1:
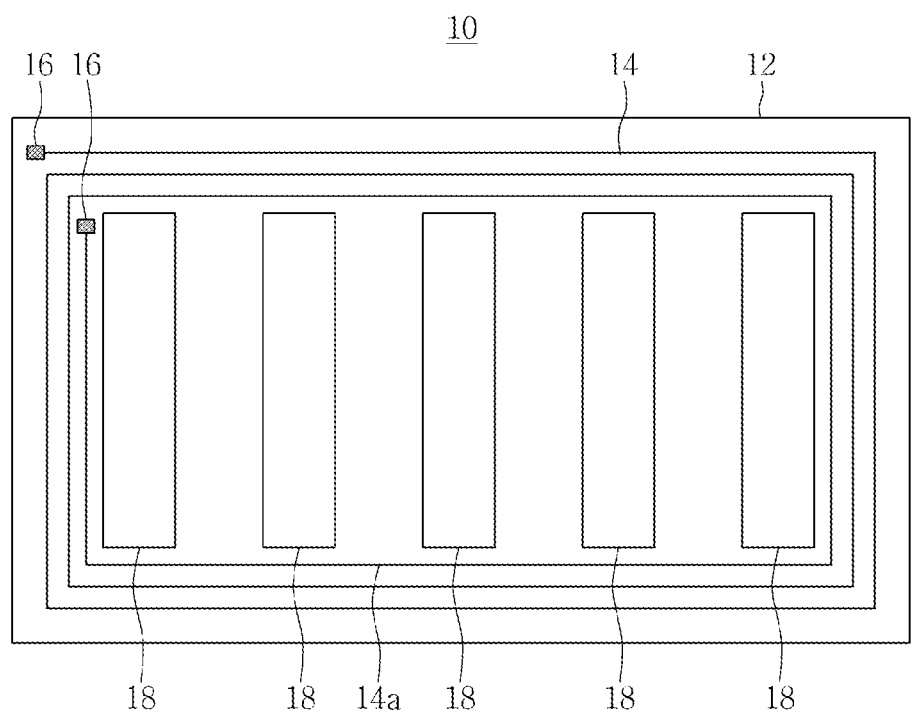
FIG. 1 is a structure of a near field communication (NFC) reader antenna in accordance with an embodiment of the application.

Disclosures of specific structures or functions in the embodiments of the application are only for the purpose of explaining embodiments of the application as examples, and the application may be embodied in different forms and should not be construed as limited to the embodiments set forth herein.

Various modifications and forms may be included, but specific embodiments are illustrated in the drawings and are described in detail. However, the application is not to be construed as limited to the specific embodiments disclosed, and it is to be understood to include all modifications, equivalents or substitutes in the scope of the present application.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present application.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Expressions explaining a relationship between elements, i.e., "between" and "directly between" or "adjacent" and "directly adjacent" may be understood likewise.

The terminology used herein is for the purpose of describing particular embodiments only and is not intended to be limiting of the present application. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Hereinafter, preferred embodiments of the application will be described with reference to the accompanying drawings.

FIG. 1 is a structure of a near field communication (NFC) reader antenna in accordance with an embodiment of the application.

Referring to FIG. 1, the NFC reader antenna 10 may include a substrate 12, a feeding loop 14, feeding terminals 16, and a plurality of passive closed loops 18.

The substrate 12 may be formed in a film made of an insulating synthetic resin, a flexible printed circuit board (FPCB), etc.

The feeding loop 14 may be formed of a conductive material, formed on a surface of the substrate 12, and receive an electrical signal from the outside through the feeding terminals 16.

Although the embodiment of FIG. 1 describes that the number of coils of the feeding loop 14 is 3, the number of coils of the feeding loop 14 may be selected from a range of 1 to 5 as necessary and, most preferably, may be selected from a range of 1 to 3. That is, since an area of the feeding loop 14 is large, as the number of coils increases, the self-resonant frequency of the feeding loop 14 decreases to 13.56 MHz or less, and thus the feeding loop 14 may not be used as an NFC loop antenna.

In a case in which the number of coils of the feeding loop 14 is 2 or more, it is preferable to form the respective coils to be as close as possible to each other. That is, when an inner coil of the feeding loop 14 is wound more inwardly, an aperture required for forming a magnetic field of the loop antenna becomes narrow and a non-communication area is partially generated due to a cancellation effect of the magnetic field at the inside of the feeding loop 14.

The plurality of passive closed loops 18 may be formed of a conductive material and formed on one side of the substrate 12 or the other side of the substrate 12.

Each of the passive closed loops 18 is formed only in an inner area of the innermost loop 14a of the feeding loop 14 (hereinafter, referred to as an inner area of the feeding loop 14). In some embodiments, a part of the passive closed loop 18 and the innermost loop 14a of the feeding loop 14 may be formed on one side and the other side of the substrate, respectively, and may be formed to perpendicularly overlap each other.

The passive closed loops 18 are formed not to be in physical contact with each other and each of the passive closed loops 18 is formed not to be in physical contact with the feeding loop 14.

None of the passive closed loops 18 overlap each other.

A part adjacent to the innermost loop 14a of the feeding loop 14 of each passive closed loop 18 is formed close to the innermost loop 14a of the feeding loop 14 and it is preferable that a shape of the part be formed according to a shape of the innermost loop 14a of the feeding loop 14.

When current flows in the feeding loop 14 through the feeding terminals 16, induced current is induced in the respective passive closed loops 18 by electromagnetic induction between the magnetic coupled feeding loop 14 and respective passive closed loops 18, and thus the magnetic field is evenly distributed in the entire area of the NFC reader antenna by the induced current.

As a result, the magnetic coupling between the NFC reader and an NFC tag is generated in the entire area of the NFC reader antenna, and thus NFC between the NFC reader and the NFC tag may be performed in an area wider than a previous area. This allows an application field of NFC to be extended to a wider range.

The embodiments of the application may be applied to various fields. As one exemplary embodiment, when NFC is performed at the front of a tablet PC, i.e., liquid crystal display (LCD) side, NFC should be performed successfully in an area as wide as an area of the LCD of the tablet PC. In this case, NFC may not be successful with a general loop antenna having only the feeding loop.

To solve this problem, the embodiment of the application is provided. A feeding loop, which extends along a front edge of the tablet PC and has 1 to 3 coils, is formed within the tablet PC, and then a plurality of passive closed loops are formed properly at optimal locations in the inner area of the feeding loop. Then, NFC may be performed in the entire area of the front of the tablet PC, and thus various application fields using NFC may be created at the front of the tablet PC.

Figure 2:
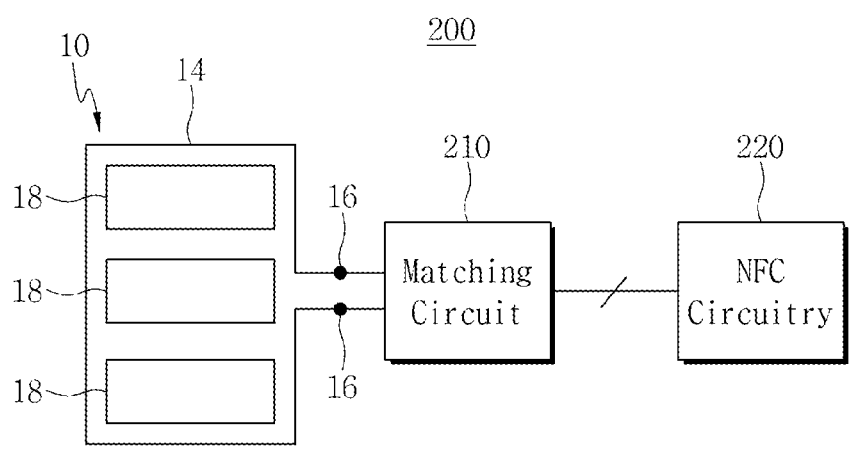
FIG. 2 is a block diagram of an NFC device having the NFC reader antenna in accordance with an embodiment of the application.

FIG. 2 is a block diagram of an NFC device having the NFC reader antenna in accordance with an embodiment of the application.

Referring to FIG. 2, an NFC device 200 may include the antenna 10, a matching circuit 210 and NFC circuitry 220.

The antenna 10 include a feeding loop 14 for receiving an electrical signal through feeding terminals 16 and three passive closed loops 18 formed on an inner area of the feeding loop 14.

As an example, the number of coils of the feeding loop 14 is 1. A feeding terminal 16 at one end of the feeding loop 14 may be electrically connected to one end of the matching circuit 210, and a feeding terminal 16 at the other end of the feeding loop 14 may be electrically connected to the other end of the matching circuit 210.

The matching circuit 210 may perform impedance matching between the NFC circuitry 220 and the antenna 10.

The NFC circuitry 220 may perform NFC with an NFC tag through the matching circuit 210 and the antenna 10. The NFC circuitry 220 may be in a chip form.

According to the embodiment of the application, the antenna 10 may allow NFC with the NFC tag to be performed in the entire inner area of the feeding loop 14.

Figure 3:
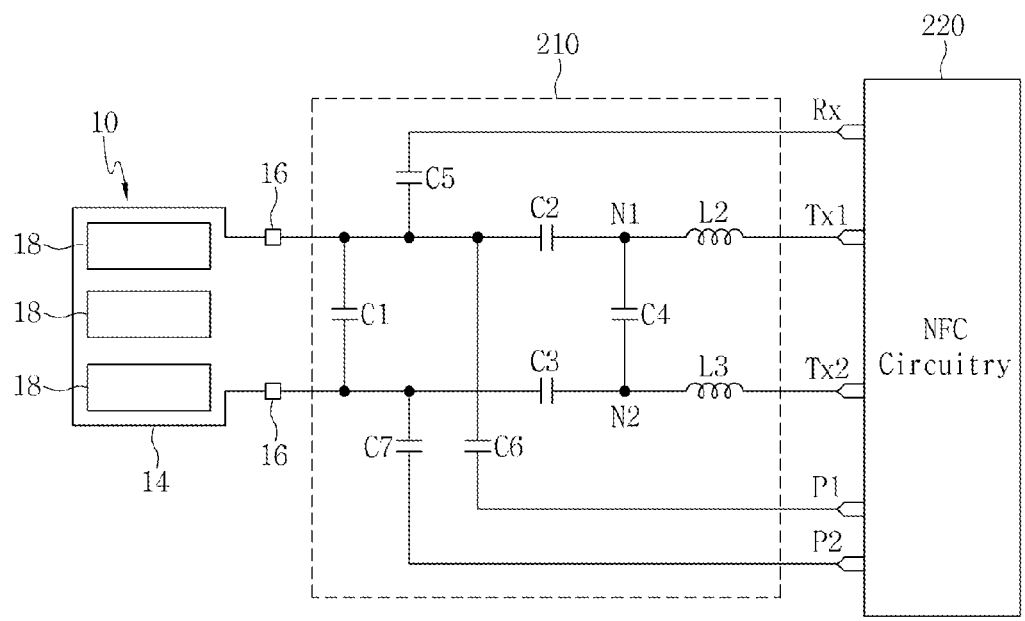
FIG. 3 is a circuit diagram of the NFC device in accordance with the embodiment of the application.

FIG. 3 is a circuit diagram of the NFC device in accordance with the embodiment of the application.

Referring to FIG. 3, the NFC device included in the mobile device, which is the NFC reader, may include the antenna 10, the matching circuit 210 and the NFC circuitry 220. The NFC circuitry 220 may be in a chip form according to an embodiment of the application.

The antenna 10 may be the antenna illustrated in FIG. 1 or 2. The antenna 10 may operate as an NFC loop antenna for NFC performed by the NFC circuitry 220. The feeding loop 14 of the antenna 10 is not directly connected to a ground.

One end of the feeding loop 14 may be connected to one end of a first capacitor C1 of the matching circuit 210 through one feeding terminal 16 and the other end of the feeding loop 14 may be connected to the other end of the first capacitor C1 of the matching circuit 210 through the other feeding terminal 16.

Accordingly, the antenna 10 functions as an inductor and may operate as a resonator having a resonant frequency suitable for NFC together with the first capacitor C1 included in the matching circuit 210.

When current flows in the feeding loop 14 through the feeding terminal 16, induced current is induced in the respective passive closed loops 18 by electromagnetic induction between the magnetic coupled feeding loop 14 and the respective passive closed loops 18, and thus a magnetic field is evenly distributed in the entire area of the antenna 10 by the induced current. This allows communication with the NFC tag to be possible in the entire antenna 10.

The matching circuit 210 may perform impedance matching between the antenna 10 and the NFC circuitry 220.

In the embodiment of the application, the matching circuit 210 may include a second capacitor C2, a third capacitor C3, a fourth capacitor C4, a fifth capacitor C5, a sixth capacitor C6, a seventh capacitor C7, a second inductor L2 and a third inductor L3.

The second capacitor C2 may be connected between one end of the feeding terminal 16 and a first node N1, the third capacitor C3 may be connected between the other end of the feeding terminal 16 and a second node N2, and the fourth capacitor C4 may be connected between the first node N1 and the second node N2.

The second inductor L2 may be connected between the first node N1 and a first transmitting terminal Tx1 of the NFC circuitry 220, and the third inductor L3 may be connected between the second node N2 and a second transmitting terminal Tx2 of the NFC circuitry 220.

Furthermore, the fifth capacitor C5 may be connected between one end of the feeding terminal 16 and a receiving terminal Rx of the NFC circuitry 220. The sixth capacitor C6 may be connected between the one end of the feeding terminal 16 and a first power terminal P1 of the NFC circuitry 220, and the seventh capacitor C7 may be connected between the other end of the feeding terminal 16 and a second power terminal P2 of the NFC circuitry 220.

Such a configuration of the matching circuit 210 is just an example, and the matching circuit 210 may be implemented by various configurations for the impedance matching between the antenna 10 and the NFC circuitry 220.

The NFC circuitry 220 may perform NFC with an external device, e.g., the NFC tag, through the matching circuit 210 and the antenna 10. The NFC circuitry 220 may be connected to the matching circuit 210 through the first power terminal P1, the second power terminal P2, the first transmitting terminal Tx1, the second transmitting terminal Tx2 and the receiving terminal Rx.

In the case in which the NFC circuitry 220 is an NFC chip, the NFC chip may perform a transmission operation and a receiving operation through the first power terminal P1 and the second power terminal P2 in an NFC card mode. Furthermore, in an NFC reader mode, the NFC chip may perform the transmission operation through the first transmitting terminal Tx1 and the second transmitting terminal Tx2 and perform a receiving operation through the receiving terminal Rx.

Figure 4:
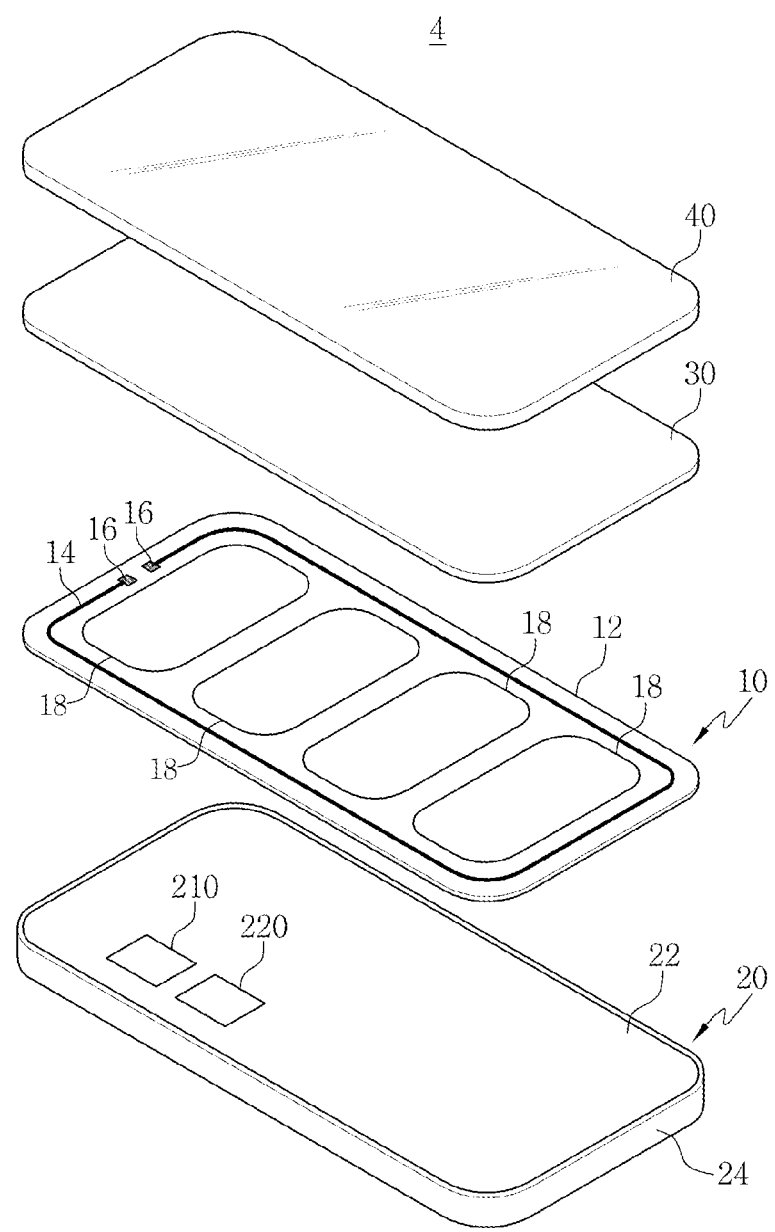
FIG. 4 is an exploded view of a configuration of an electronic device having the NFC device in accordance with an embodiment of the application.

FIG. 4 is an exploded view of a configuration of an electronic device having the NFC device in accordance with an embodiment of the application.

Referring to FIG. 4, the electronic device may be a mobile device 4, and the mobile device 4 may include an antenna 10, a body 20, a display panel 30 and a front cover 40.

The mobile device 4 may be an arbitrary mobile device such as a smart phone, a cellular phone, a tablet PC, a laptop computer, a personal digital assistant (PDA), a portable multimedia player (PMP), a digital camera, a music player, a portable game console, a navigation, etc.

The body 20 may include a body housing 24, and the body housing 24 forms a frame of an overall shape of the mobile device 4 and may be formed of an insulating material such as plastic, etc. The body housing 24 may include a printed circuit board 22 having various electronic circuit chips or electric elements.

The printed circuit board 22 disposed inside the body housing 24 may include a matching circuit 210 connected to a feeding loop 14 of the antenna 10 and NFC circuitry 220 connected to the matching circuit 210.

The antenna 10 may include a substrate 12, the feeding loop 14 which is formed on one side of the substrate 12 and connected to the matching circuit 210 through feeding terminals 16, and a plurality of passive closed loops 18 which are formed in the inner area of the feeding loop 14 at one side or the other side of the substrate 12.

FIG. 4 shows an example in which the number of coils of the feeding loop 14 is 1. The remaining descriptions the same as described in the FIG. 1 will be omitted.

The display panel 30 displays an image according to a signal received from an image processing circuit mounted in the printed circuit board 22. The display panel 30 may be a LCD panel, a light emitting diode (LED) panel, a plasma display panel (PDP) panel, an organic light emitting diode (OLED) panel, etc.

The front cover 40 is formed of a transparent material and may cover the front of the display panel 30.

Figure 5:
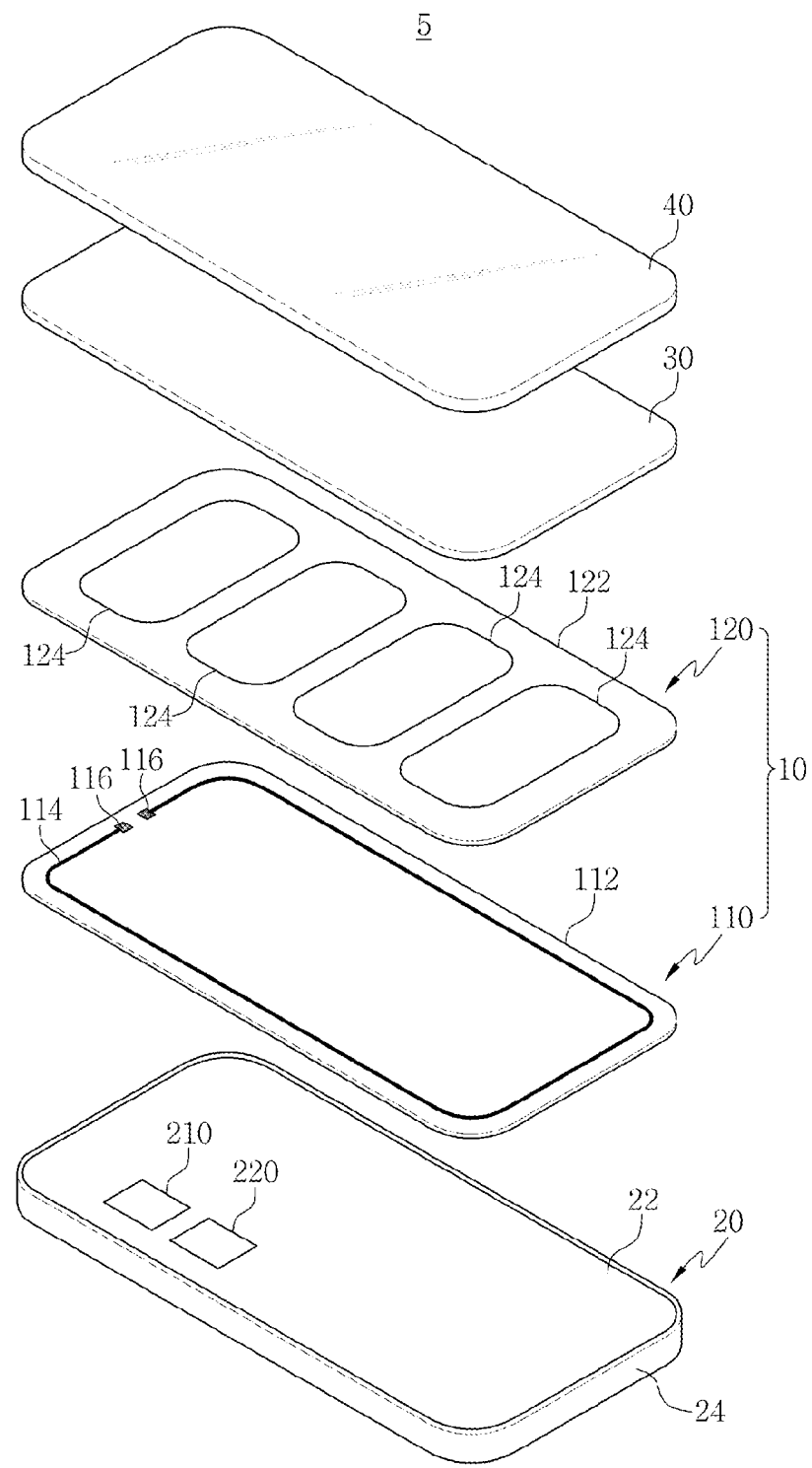
FIG. 5 is an exploded view of a configuration of the electronic device having the NFC device in accordance with another embodiment of the application.

FIG. 5 is an exploded view of a configuration of the electronic device having the NFC device in accordance with another embodiment of the application.

Referring FIG. 5, the electronic device may be a mobile device 5 and the mobile device 5 may include an antenna 10, a body 20, a display panel 30 and a front cover 40.

The mobile device 5 may be an arbitrary mobile device such as a smart phone, a cellular phone, a tablet PC, a laptop computer, a PDA, a PMP, a digital camera, a music player, a portable game console, a navigation, etc.

The antenna 10 may include a feeding loop part 110 and a passive loop part 120.

The feeding loop part 110 may include a first substrate 112 and a feeding loop 114 which is formed on one side of the first substrate 112 and connected to the matching circuit 210 through feeding terminals 116.

The passive loop part 120 may include a second substrate 122 and four passive closed loops 124 formed on one side or the other side of the second substrate 122.

The first substrate 112 and the second substrate 122 may be formed in a film made of an insulating synthetic resin, FPCB, etc.

The respective passive closed loops 124 are disposed in an inner area of the feeding loop 114 without physically contacting the feeding loop 114.

The descriptions of the body 20, the display panel 30 and the front cover 40 which are the same as described in FIG. 4 will be omitted.

Figure 6:
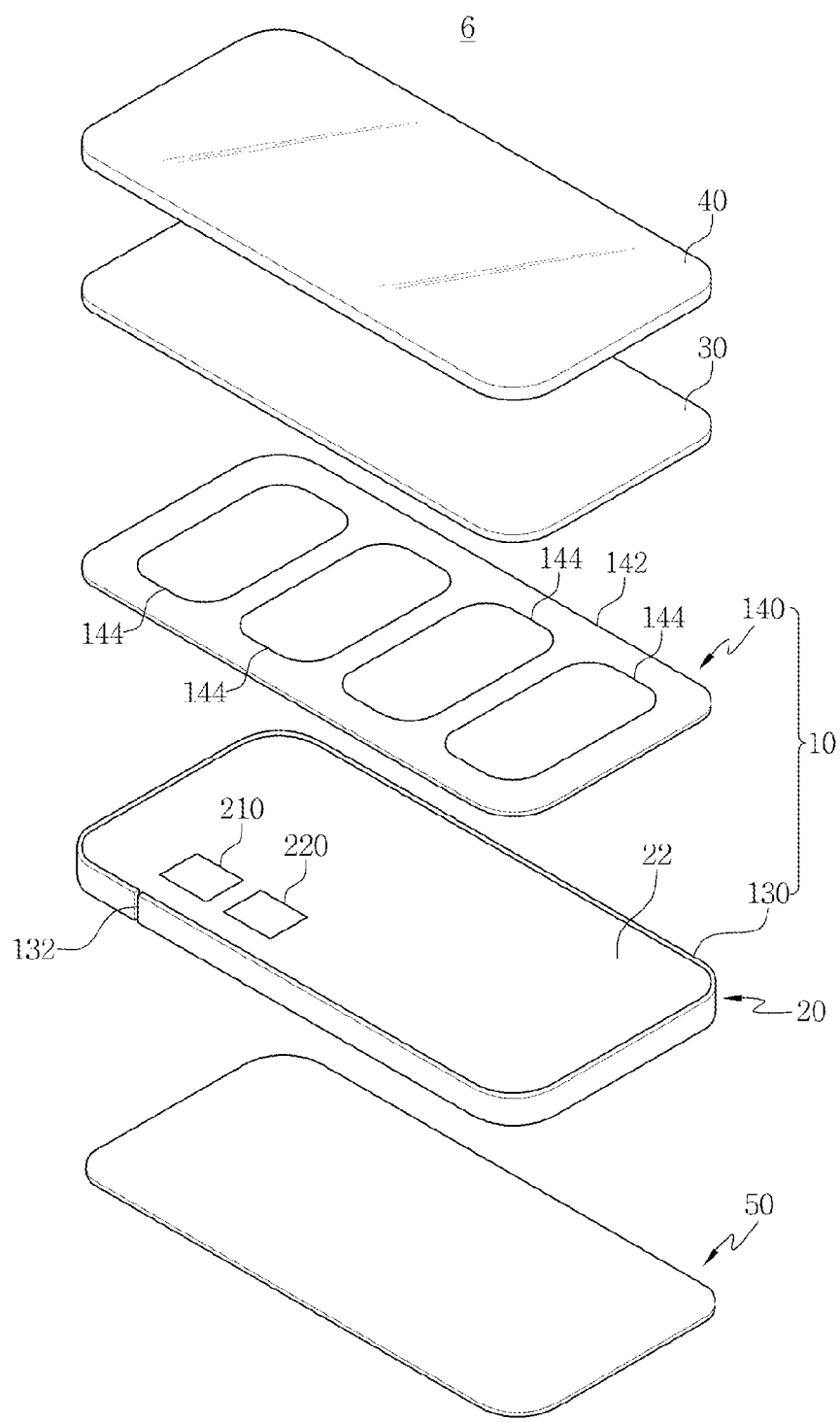
FIG. 6 is an exploded view of a configuration of the electronic device having the NFC device in accordance with still another embodiment of the application.

FIG. 6 is an exploded view of a configuration of the electronic device having the NFC device in accordance with still another embodiment of the application.

Referring to FIG. 6, the electronic device may be a mobile device 6, and the mobile device 6 may include an antenna 10, a body 20, a display panel 30, a front cover 40 and a rear cover 50.

The mobile device 6 may be an arbitrary mobile device such as a smart phone, a cellular phone, a tablet PC, a laptop computer, a PDA, a PMP, a digital camera, a music player, a portable game console, a navigation, etc.

The antenna 10 may include a metal frame 130 and a passive loop part 140.

The metal frame 130 includes a slit 132 filled with an insulating material and may be formed to surround sides of the body housing forming the body 20. Furthermore, the metal frame 130 may operate as the feeding loop.

Figure 7:
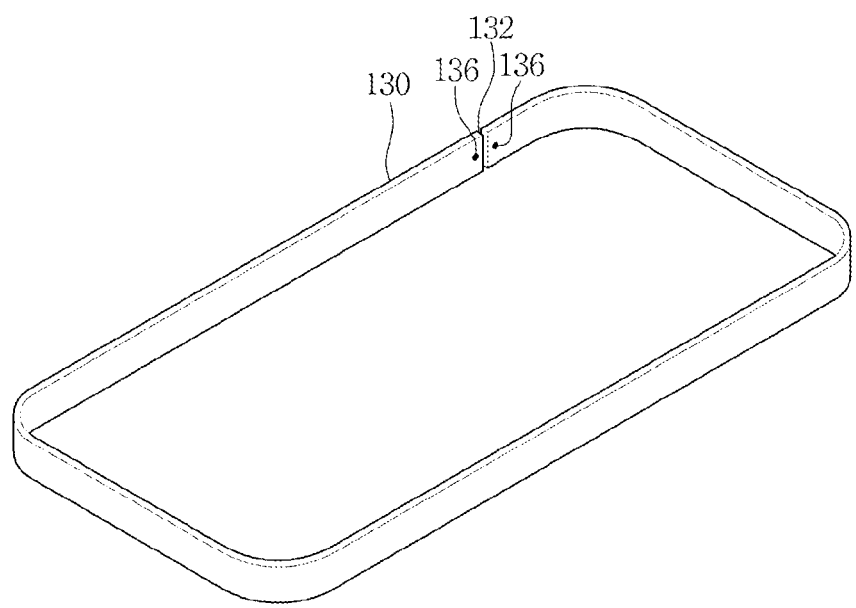
FIG. 7 illustrates a structure of a metal frame 130 according to the embodiment of FIG. 6.

FIG. 7 illustrates a structure of a metal frame 130 according to the embodiment of FIG. 6.

Referring to FIG. 7, the metal frame 130 has a predetermined height and a rectangular frame shape which has a hollow central part, and has a slit 132 for separating the metal frame 130 at one side thereof.

The metal frame 130 may be formed of at least one metal or an alloy of at least two metals among copper (Cu), aluminum (Al), iron (Fe), titanium (Ti), silver (Ag), palladium (Pd), platinum (Pt), gold (Au) or nickel (Ni). Also, the metal frame 130 may be formed of at least one metal or an alloy of at least two metals among metals different from the above.

An inner side and/or upper and bottom sides of the metal frame 130 may be coated with ferrite or a magneto dielectric material (MDM) for preventing interference by a surrounding RF communication and improving an efficiency of the antenna.

Feeding terminals 136, which are electrically connected to the matching circuit 210, are formed on both ends of the inside of the metal frame 130, respectively.

Referring to FIG. 6 again, the passive loop part 140 may include a third substrate 142 and four passive closed loops 144 formed on one side or the other side of the third substrate 142.

The third substrate 142 may be formed in a film made of an insulating synthetic resin, FPCB, etc.

Respective passive closed loops 144 are disposed in the inner area of the metal frame 130 without physically contacting the metal frame 130.

When current flows in the metal frame 130 through the feeding terminal 136, induced current is induced in the respective passive closed loops 144 by electromagnetic induction between the magnetic coupled metal frame 130 and the respective passive closed loops 144, and thus the magnetic field is evenly distributed in the entire area of the metal frame 130 forming the antenna 10 by the induced current, thereby NFC with the NFC tag may be performed in the entire antenna 10. Thereby, the metal frame 130 functions as the feeding loop.

In some embodiments, the metal frame 130 may include many frame segments and slits may be formed between the respective frame segments.

The frame segments may be connected to each other in series and connected to the matching circuit, or each of the plurality of frame segments may be connected to the matching circuit in parallel.

The descriptions of the body 20, the display panel 30 and the front cover 40 which are the same as described in FIG. 4 will be omitted.

The rear cover 50 may be formed of an insulating material such as a plastic, etc., and may cover a rear side of the body 20.

FIGS. 8A to 8E are view illustrating various examples of arrangement forms of the antenna in accordance with the embodiment of the application.

Figure 8A:
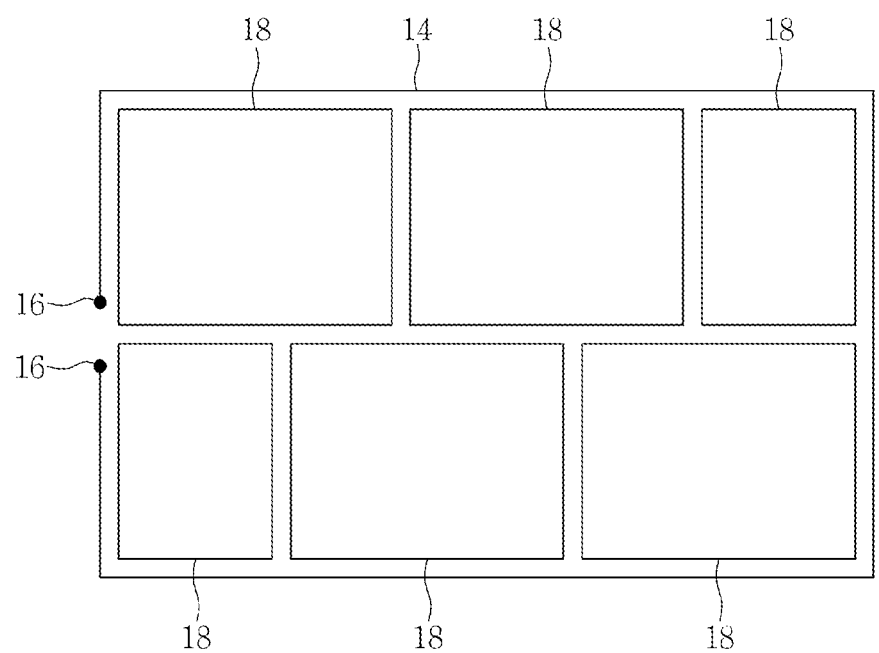
FIGS. 8A to 8E are views illustrating various examples of arrangement forms of the antenna in accordance with the embodiment of the application.
Figure 8B:
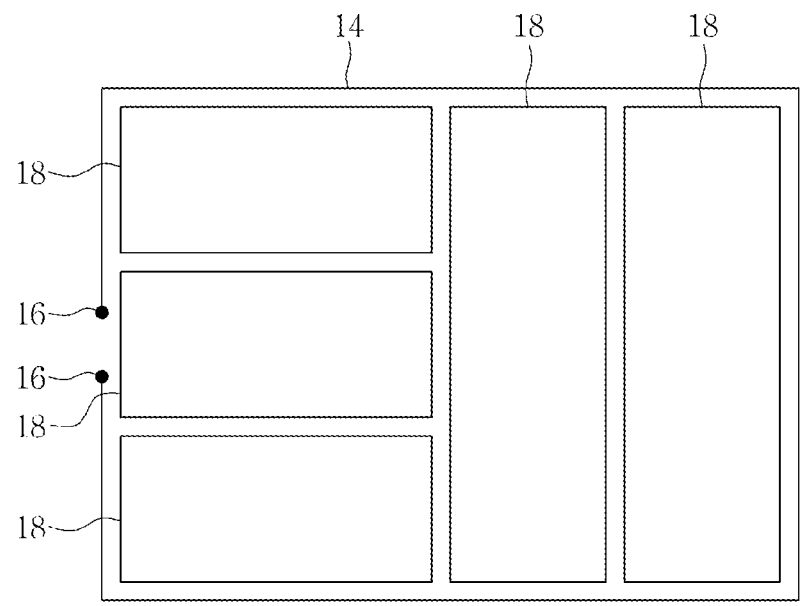

Referring to FIG. 8A, a rectangular feeding loop 14 which receives an electrical signal from the outside through the feeding terminals 16 and six passive closed loops 18 disposed in the inner area of the feeding loop 14 are disposed to form the antenna.

The respective six passive closed loops 18 may be formed in different sizes or the same size, or three passive closed loops in different sizes are disposed in a first row and three passive closed loops which are rotated 180 degrees from the three passive closed loops disposed in the first row may be disposed in a second row.

Referring to 8B, a rectangular feeding loop 14 which receives an electrical signal from the outside through the feeding terminals 16 and five passive closed loops 18 disposed in the inner area of the feeding loop 14 are disposed to form the antenna.

Three passive closed loops disposed in the left side among the five passive closed loops 18 are formed to be long in a horizontal direction and two passive closed loops disposed in the right side among the five passive closed loops 18 are formed to be long in a vertical direction.

Figure 8C:
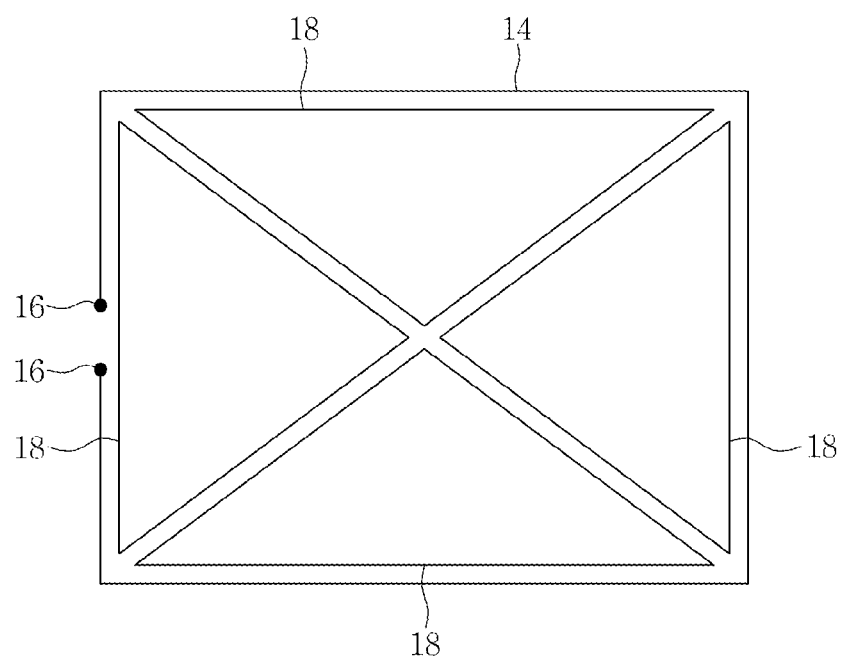

Referring to FIG. 8C, a rectangular feeding loop 14 which receives an electrical signal from the outside through the feeding terminal 16 and four passive closed loops 18 disposed in the inner area of the feeding loop 14 are disposed to form the antenna.

The four passive closed loops 18 are formed in a triangular shape, a base of each of the passive closed loops 18 is adjacent to a side of a corresponding feeding loop, and apexes of the respective passive closed loops 18 are located in the center of the inner area of the feeding loop 14.

Figure 8D:
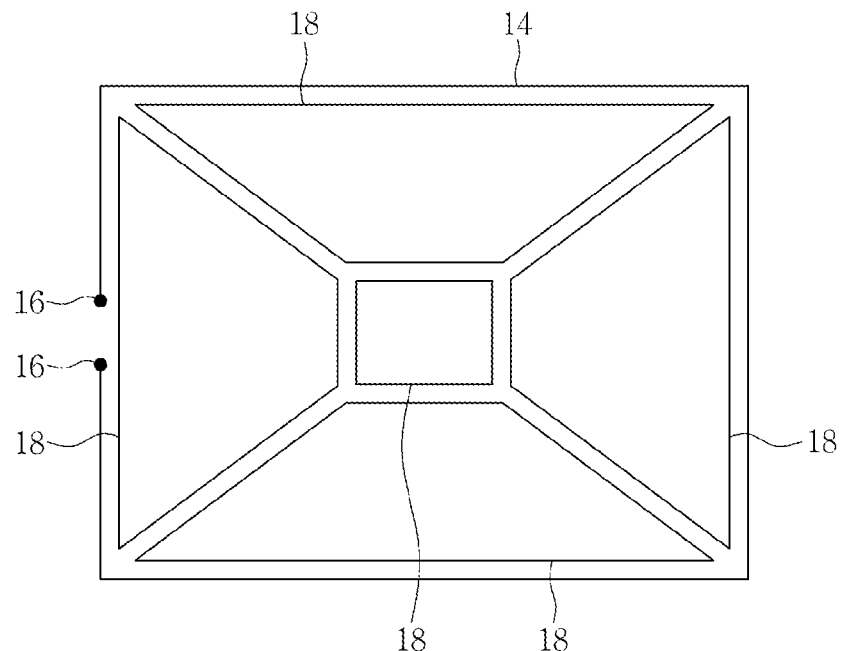

Referring to FIG. 8D, a rectangular feeding loop 14 which receives an electrical signal from the outside through the feeding terminals 16 and five passive closed loops 18 disposed in the inner area of the feeding loop 14 are disposed to form the antenna.

Four passive closed loops disposed on the periphery among the five passive closed loops 18 are formed in a trapezoidal shape and one passive closed loop in the center is formed in a square shape.

Figure 8E:
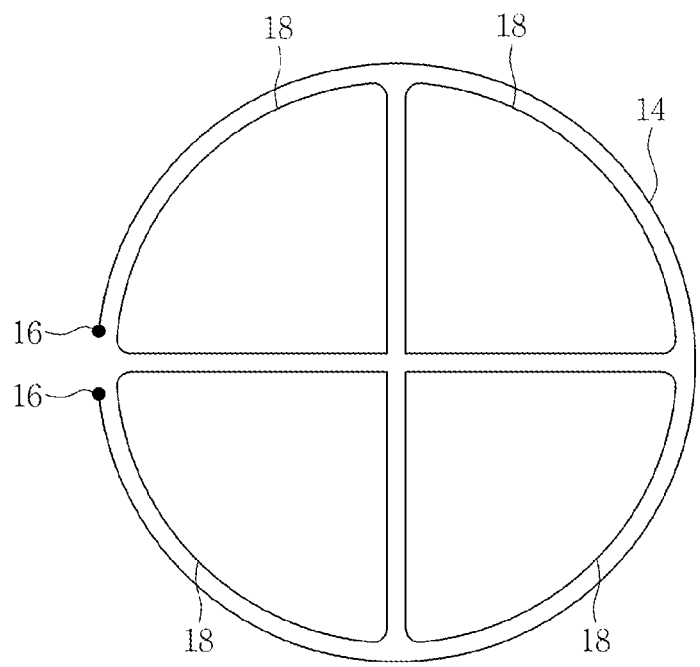

Referring to FIG. 8E, a circular feeding loop 14 which receives an electrical signal from the outside through the feeding terminals 16 and four fan-shaped passive closed loops 18 disposed in the inner area of the feeding loop 14 are disposed to form the antenna.

A part adjacent to the circular feeding loop 14 of each of the passive closed loops is formed in a curved shape according to a curved shape of the feeding loop 14 adjacent to the part.

In examples in FIGS. 8A to 8E, the feeding loop 14 and the plurality of passive closed loops 18 may be formed on the identical substrate, or the feeding loop 14 may be formed on the first substrate 112 and the plurality of passive closed loops 18 may be formed on the second substrate 122, or the feeding loop 14 may be formed with the metal frame 130 supporting sides of the electronic device and the plurality of passive closed loops 18 may be formed on a separate substrate 142.

The configurations of the antennas illustrated in FIGS. 8A to 8E are just examples, and the number, shape, size and arrangement form of the passive closed loops may be suitably determined according to operation environments for NFC such as a size of the feeding loop, the number of coils of the feeding loop, a size of a tag antenna formed on the tag, etc.

Figure 9:
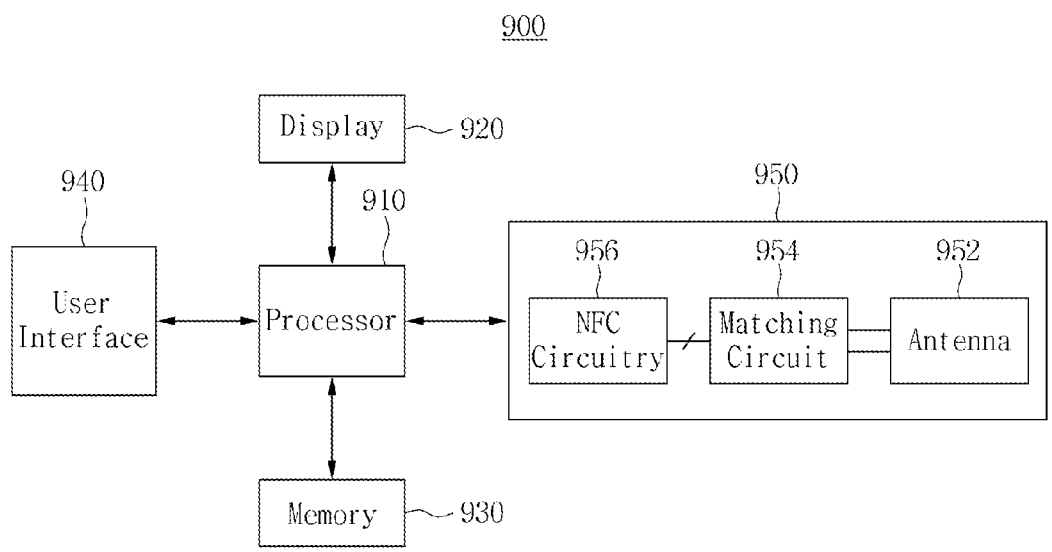
FIG. 9 is a block diagram illustrating a configuration of an electronic device having the NFC device in accordance with the embodiment of the application.

FIG. 9 is a block diagram illustrating a configuration of an electronic device having the NFC device in accordance with the embodiment of the application.

Referring to FIG. 9, a mobile device 900, which is an example of the electronic device, may include a processor 910, a display 920, a memory 930, a user interface 940 and an NFC device 950.

The mobile device 900 may be an arbitrary mobile device such as a smart phone, a cellular phone, a PDA, a PMP, a digital camera, a music player, a portable game console, a navigation system, a laptop computer, etc.

The processor 910 may control overall operations of the mobile device 900. In an embodiment, the processor 910 may be an application processor (AP) which executes applications providing Internet browsers, games, moving pictures, etc.

In some embodiments, the processor 910 may include a single core processor or a multi-core processor. For example, the processor 910 may include a multi-core such as dual-core, quad-core, hexa-core, etc.

The display 920 may receive an image signal processed by the processor 910 and display an image according to the received image signal. The display 920 may be an LCD, an LED, a PDP, an OLED, etc.

The memory 930 stores data required for an operation of the mobile device 900. For example, the memory 930 may store a booting image for booting the mobile device 900 and may store data transmitted to/received from an external device.

The memory 930 may be implemented as a volatile memory such as a dynamic random access memory (DRAM), a static random access memory (SRAM), a mobile DRAM, a double data rate synchronous dynamic random access memory (DDR SDRAM), a low power double data rate (LPDDR) SDRAM, a graphics double data rate (GDDR) SDRAM, a rambus dynamic random access memory (RDRAM), etc., or implemented as a non-volatile memory such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 940 may include one or more input devices such as a keypad, a touch screen, etc.

The NFC device 950 may perform NFC with an external device such as an NFC tag. The NFC device 950 may include an antenna 952 according to the embodiment of the application, a matching circuit 954 which performs impedance matching between the antenna 952 and NFC circuitry 956, and the NFC circuitry 956 which performs NFC with an external device such as an NFC tag through the antenna 952 and the matching circuit 954.

Also, in some embodiments, the mobile device 900 may further include an image processor, and a storage device such as a memory card, a solid state drive (SSD), a hard disk drive (HDD), a CD-ROM, etc.

Components of the mobile device 900 may be mounted using various types of packages such as a package on package (PoP), ball grid arrays (BGAs), chip scale packages (CSPs), plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat-pack (TQFP), a small outline integrated circuit (SOIC), a shrink small outline package (SSOP), a thin small outline package (TSOP), a system in package (SIP), a multi-chip package (MCP), a wafer-level fabricated package (WFP), a wafer-level processed stack package (WSP), etc.

Figure 10:
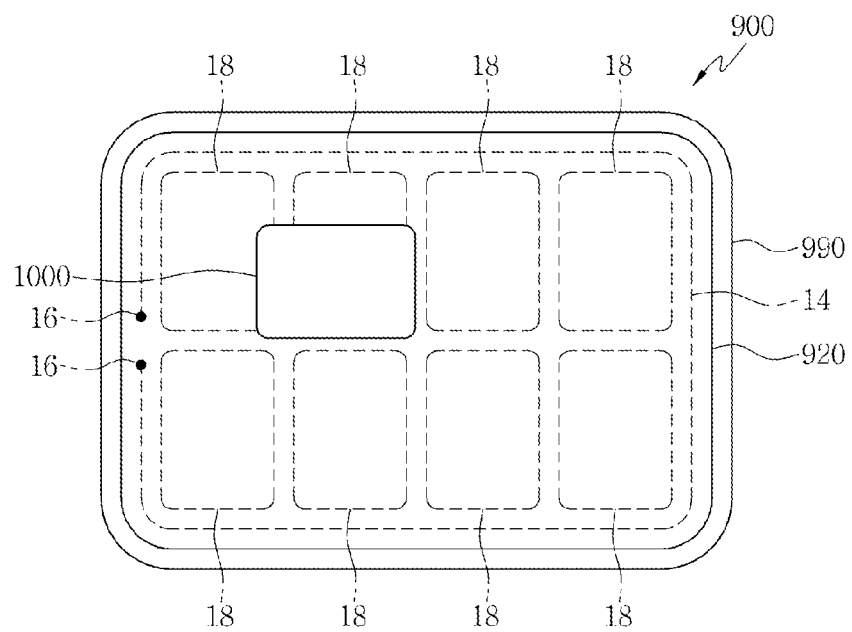
FIG. 10 is a view illustrating an aspect in which the NFC antenna in accordance with the embodiment of the application is applied.

FIG. 10 is a view illustrating an aspect in which the NFC antenna in accordance with an embodiment of the application is applied.

Referring to FIG. 10, a mobile device 900, e.g., a tablet PC, may include a display 920 formed on a body 990, a feeding loop 14 which is formed along a boundary between the display 920 and the body 990, and receives an electrical signal through feeding terminals 16, and eight passive closed loops 18 formed in an inner area of the feeding loop 14.

According to the above structure, a magnetic field is evenly distributed in the entire area of the NFC reader antenna. Further, when an NFC tag 1000 such as a smart card is close to the inner area of the feeding loop 14 configuring the NFC reader antenna, NFC may be performed between the NFC reader antenna and the NFC tag antenna by the magnetic coupling between the NFC reader antenna having the feeding loop 14 and the passive closed loops 18 and a tag antenna formed on the NFC tag 1000.

A size of the passive closed loop 18 may be formed to be equal to or less than 150% of the size of the loop antenna formed on the NFC tag, and most preferably, the size of the passive closed loop 18 is formed to be equal to or less than 110% of the size of the loop antenna formed on the NFC tag.

According to the embodiments of the application, a non-communication area between the NFC reader and the NFC tag within an inner area of the loop antenna of the NFC reader can be prevented from being generated even when the area of the loop antenna of the NFC reader becomes large.

The embodiment of the application may be used in the NFC device. Also, the embodiment of the application may be used in the mobile device using the NFC device.

Although a few embodiments have been described, those skilled in the art will readily appreciate that embodiments described above are combined or many modifications are possible in embodiments without materially departing from the novel teachings and advantages.

What is claimed is:

1. A near field communication (NFC) reader antenna comprising:
   a first loop configured to receive an electrical signal from outside, without any loop being disposed in an outer area of the first loop; and
   a plurality of passive closed loops disposed in an inner area of the first loop,
   wherein the plurality of passive closed loops do not overlap each other.

2. The antenna of claim 1, wherein each of the plurality of passive closed loops is magnetically coupled to the first loop.

3. The antenna of claim 1, wherein the first loop is formed on one side of a substrate and the plurality of passive closed loops are formed on the one side or the other side of the substrate.

4. The antenna of claim 1, wherein the plurality of passive closed loops are substantially formed in the same size.

5. The antenna of claim 1, wherein in each of the plurality of passive closed loops, a shape of a part thereof adjacent to the first loop matches a shape of an adjacent part of the first loop.

6. A near field communication (NFC) reader device comprising:
NFC circuitry configured to perform NFC;
an antenna connected to the NFC circuitry; and
a matching circuit configured to perform impedance matching between the NFC circuitry and the antenna,
wherein:
the antenna comprises:
a first loop configured to receive an electrical signal; and
a plurality of passive closed loops disposed in an inner area of the first loop, and the plurality of passive closed loops do not overlap each other,
wherein the first loop is formed as a metal frame configured to support sides of an electronic device.

7. The NFC reader device of claim 6, wherein the first loop is formed on one side of a substrate and the plurality of passive closed loops are formed on the one side or the other side of the substrate.

8. The NFC reader device of claim 6, wherein in each of the plurality of passive closed loops, a shape of a part thereof adjacent to the first loop matches to a shape of an adjacent part of the first loop.

9. The NFC reader device of claim 6, wherein a size of each of the passive closed loops is equal to or less than 110% of a size of a loop antenna formed on an adjacent NFC tag.

10. An antenna comprising:
an outer electrically-conductive loop; and
two electrically-conductive closed loops that each has a smaller perimeter than the perimeter of the outer electrically-conductive loop, wherein
an electrical current flowing through the outer loop induces an electrical current to flow through each of the one or more closed loops through an electromagnetic field,
wherein the number of coils of the outer electrically-conductive loop is 2 or more.

11. The antenna of claim 10, wherein:
one of the two closed loops has a different perimeter than the other of the two closed loops.

12. The antenna of claim 10, wherein:
both of the two closed loops have the same geometric shape but different directional orientations with respect to the outer loop.

13. The antenna of claim 10, wherein:
each of the two closed loops is directionally oriented with respect to the outer loop so as to maximize an amount of its perimeter having the same contour as a portion of the outer loop that is closest to the closed loop.

14. The antenna of claim 10, wherein:
the two closed loops are directionally oriented with respect to the outer loop so as to maximize the combined electromagnetic coupling between the outer loop and the two closed loops with respect to any other directional orientation of the two closed loops.

15. The antenna of claim 10, wherein the resonant frequency of each of the two closed loops is approximately 13.56 MHz, and the resonant frequency of the outer loop is less than 13.56 MHz.

16. A mobile computing device comprising the antenna of claim 13, wherein
the perimeter of the mobile computing device is substantially the same as the combined lengths of the perimeter of the outer loop and the length of an insulator separating electrodes disposed at opposite ends of the outer loop.

* * * * *